US012649693B2

(12) United States Patent
Kim et al.

(10) Patent No.: US 12,649,693 B2
(45) Date of Patent: Jun. 9, 2026

(54) ANTIFERROELECTRIC CONTAINING DYSPROSIUM AND A MANUFACTURING METHOD THEREOF

(71) Applicants: HYUNDAI MOTOR COMPANY, Seoul (KR); KIA CORPORATION, Seoul (KR); KOREA INSTITUTE OF CERAMIC ENGINEERING AND TECHNOLOGY, Jinju-si (KR)

(72) Inventors: Hyung Suk Kim, Gwangmyeong-si (KR); Hyo Soon Shin, Jinju-si (KR); Dong Hun Yeo, Seoul (KR); Jeoung Sik Choi, Changwon-si (KR)

(73) Assignees: HYUNDAI MOTOR COMPANY, Seoul (KR); KIA CORPORATION, Seoul (KR); KOREA INSTITUTE OF CERAMIC ENGINEERING AND TECHNOLOGY, Jinju-si (KR)

( * ) Notice: Subject to any disclaimer, the term of this patent is extended or adjusted under 35 U.S.C. 154(b) by 177 days.

(21) Appl. No.: 18/226,694

(22) Filed: Jul. 26, 2023

(65) Prior Publication Data

US 2024/0124363 A1     Apr. 18, 2024

(30) Foreign Application Priority Data

Oct. 13, 2022    (KR) ........................ 10-2022-0131034

(51) Int. Cl.
*C04B 35/515* (2006.01)
*C04B 35/491* (2006.01)
*H01G 4/008* (2006.01)

(52) U.S. Cl.
CPC ........ *C04B 35/5156* (2013.01); *C04B 35/491* (2013.01); *H01G 4/008* (2013.01);
(Continued)

(58) Field of Classification Search
None
See application file for complete search history.

(56) References Cited

U.S. PATENT DOCUMENTS 10,957,807 B2    3/2021   Kotru et al.
2001/0022487 A1   9/2001   Takeuchi et al.
(Continued)

FOREIGN PATENT DOCUMENTS

CN          1990418 A      7/2007
CN        104692799 A      6/2015
(Continued)

OTHER PUBLICATIONS

Jiang et al., "Effect of Zr:Sn ratio in the lead lanthanum zirconate stannate titanate anti-ferroelectric ceramics on energy storage properties," Ceramics International 39:5 (2013), pp. 5571-5575. (Year: 2013).*
(Continued)

*Primary Examiner* — Amber R Orlando
*Assistant Examiner* — Paul Alan Forsyth
(74) *Attorney, Agent, or Firm* — Lempia Summerfield Katz LLC

(57) ABSTRACT

An antiferroelectric and a method for manufacturing an antiferroelectric are disclosed herein. The antiferroelectric may have high permittivity and breakdown voltage by having a $Pb_xLa_{1-x}([Zr_{1-y}Sn_y]_zTi_{1-z})$ composition. The manufacturing of the antiferroelectric may be performed through appropriate mixing and dysprosium addition.

10 Claims, 4 Drawing Sheets

(52) U.S. Cl.
CPC ................. *C04B 2235/3227* (2013.01); *C04B 2235/3232* (2013.01); *C04B 2235/3244* (2013.01); *C04B 2235/3284* (2013.01); *C04B 2235/3293* (2013.01); *C04B 2235/3296* (2013.01); *C04B 2235/77* (2013.01)

(56) References Cited

U.S. PATENT DOCUMENTS

| | | | | |
|---|---|---|---|---|
| 2014/0072819 A1* | 3/2014 | Fujii | ................ | C04B 35/63444 |
| | | | | 428/518 |
| 2014/0185183 A1 | 7/2014 | Park et al. | | |
| 2015/0102253 A1* | 4/2015 | Kim | .................. | H10N 30/8554 |
| | | | | 252/62.9 PZ |
| 2016/0240318 A1 | 8/2016 | Engel et al. | | |
| 2022/0158587 A1* | 5/2022 | Hock | ....................... | H03D 7/00 |

FOREIGN PATENT DOCUMENTS

| | | | | | |
|---|---|---|---|---|---|
| CN | 110526707 A | 12/2019 | | | |
| JP | H0768753 A | 3/1995 | | | |
| KR | 101452077 B1 | 10/2014 | | | |
| WO | WO-2022063053 A1 * | 3/2022 | ............... | H03H 3/02 |

OTHER PUBLICATIONS

Xu et al., "High charge-discharge performance of Pb0.98La0.02(Zr0.35Sn0.55Ti0.10)0.99503 antiferroelectric ceramics," J. Appl. Phys. 120:7 (2016), 074107. (Year: 2016).*

Machine Translation of WO-2022063053-A1 ("Tang"). (Year: 2022).*

Zhilun et al., "Low-Temperature Sintering of Lead-Based Piezoelectric Ceramics," J. American Ceramic Society 72 (1989), pp. 486-491. (Year: 1989).*

Banerjee et al., "Free-Standing Lead Zirconate Titanate Nanoparticles: Low-Temperature Synthesis and Densification," Chemistry of Materials 16:26 (2004), pp. 5610-5615. (Year: 2004).*

Liu et al., "Temperature-dependent stability of energy storage properties of Pb0.97La0.02(Zr0.58Sn0.335Ti0.085)O3 antiferroelectric ceramics for pulse power capacitors," Appl. Phys. Lett. 106:26 (2015), 262901. (Year: 2015).*

Mirshekarloo, Meysam Sharifzadeh, et al., Large strain and high energy storage density in orthorhombic perovskite (Pb0.97La0.02)(Zr1-x-ySnxTiy)O3 antiferroelectric thin films, Applied Physics Letters 97, 142902 (2010), 5pp, https://doi.org/10.1063/1.3497193.

Yijie Chen et al., The effect of Sn4+ doping on the electrostrictive property of PLZT (9/65/35) transparent electro-optical ceramics, Ceramics International, vol. 46, Issue 5, 2020, https://doi.org/10.1016/j.ceramint.2019.11.163; 7 pp.

* cited by examiner

ANTIFERROELECTRIC CONTAINING DYSPROSIUM AND A MANUFACTURING METHOD THEREOF

CROSS-REFERENCE TO RELATED APPLICATION

This application claims under 35 U.S.C. § 119(a) the benefit of priority to Korean Patent Application No. 10-2022-0131034 filed on Oct. 13, 2022, the entire contents of which are incorporated herein by reference.

BACKGROUND

(a) Technical Field

The present disclosure relates to an antiferroelectric containing dysprosium and a manufacturing method thereof.

(b) Background Art

A direct current (DC) link capacitor is essentially included in an inverter for an electric vehicle drive motor. A polypropylene film or the like may be used as an insulator in a capacitor applied to the inverter. At this time, because a polymer material has been used as the insulator, there has been a problem in that operation is impossible at high temperatures.

In order to solve the problem as described above, a method of covering the film-type capacitor with a molding material for heating has conventionally been used, but this has a new problem of increasing the size and weight of the entire capacitor. Therefore, in order to solve the problem as described above, barium titanate ($BaTiO_3$), a material having superior permittivity and capacity and excellent temperature characteristics, has been used, but the material has a disadvantage in that the permittivity is reduced at high voltages.

Conventionally, in order to solve the problems as described above, attempts to replace barium titanate ($BaTiO_3$) material in which the permittivity is lowered as the voltage increases with an antiferroelectric (AFE) material in which the permittivity and capacitor capacity increase as it is used at high voltages have been in progress.

Currently, development of an antiferroelectric composition based on a $(Pb(La)(Zr, Ti)O_3)$ material that may include lead, lanthanum, zirconium, and titanium as the antiferroelectric material is actively in progress.

The statements in this BACKGROUND section merely provide background information related to the present disclosure and may not constitute prior art.

SUMMARY OF THE DISCLOSURE

The present disclosure is to solve the problems as described above, and an object of the present disclosure is to provide an antiferroelectric having high permittivity and breakdown voltage by containing dysprosium.

The objects of the present disclosure are not limited to the object mentioned above. The objects of the present disclosure become more apparent from the following description, and are realized by means and combinations thereof described in the claims.

A method for manufacturing an antiferroelectric according to the present disclosure may include: mixing dielectric precursors to obtain a precursor mixture; calcining the precursor mixture to obtain a calcined product; pressurizing the calcined product to obtain a molded article; adding dysprosium (Dy) to the molded article to obtain a resulting product; and sintering the resulting product to obtain a sintered body/antiferroelectric, wherein the antiferroelectric may have a $Pb_xLa_{1-x}([Zr_{1-y}Sn_y]_ZTi_{1-Z})$ composition. (X, Y, and Z are number from 0 to 1, respectively.)

The dielectric precursors may include 50% by weight to 60% by weight of lead oxide (PbO), 15% by weight to 30% by weight of zirconium oxide ($ZrO_2$), an 1% by weight to 5% by weight of titanium oxide ($TiO_2$), 8% by weight to 14% by weight of lanthanum oxide ($La_2O_5$), and 1% by weight to 16% by weight of tin oxide ($SnO_2$).

Dysprosium (Dy) may be contained in 0.1% by weight to 0.4% by weight based on 100% by weight of the antiferroelectric.

In the sintering process to obtain the sintered body, a sintered agent may be added, and the sintered agent may include 1% by weight to 4% by weight of zinc oxide (ZnO) and 1% by weight to 10% by weight of lead oxide (PbO) based on 100% by weight of the antiferroelectric.

The sintering temperature in the sintering process to obtain the sintered body may be at a temperature in a range of 900° C. to 1100° C.

X may be $0.87 \leq X \leq 0.89$.

Y may be $0.53 \leq Y \leq 0.55$.

Z may be $0.77 \leq Z \leq 0.79$.

The antiferroelectric may have a density in a range of 7.5 $g/cm^3$ to 8.0 $g/cm^3$.

The antiferroelectric may have a permittivity ($\varepsilon$) of 1000 or more.

The antiferroelectric may have a breakdown voltage of about 10 kV/mm or more.

A capacitor according to the present disclosure may include the antiferroelectric, e.g., manufactured by the manufacturing method according to the present disclosure. The capacitor may further include an electrode disposed on the surface of the antiferroelectric, wherein the electrode may include copper (Cu).

The antiferroelectric according to the present disclosure may have a breakdown voltage of 10 kV/mm or more.

The effects of the present disclosure are not limited to the above-mentioned effect. It should be understood that the effects of the present disclosure include all effects that can be inferred from the following description.

DETAILED DESCRIPTION

Figure 1:
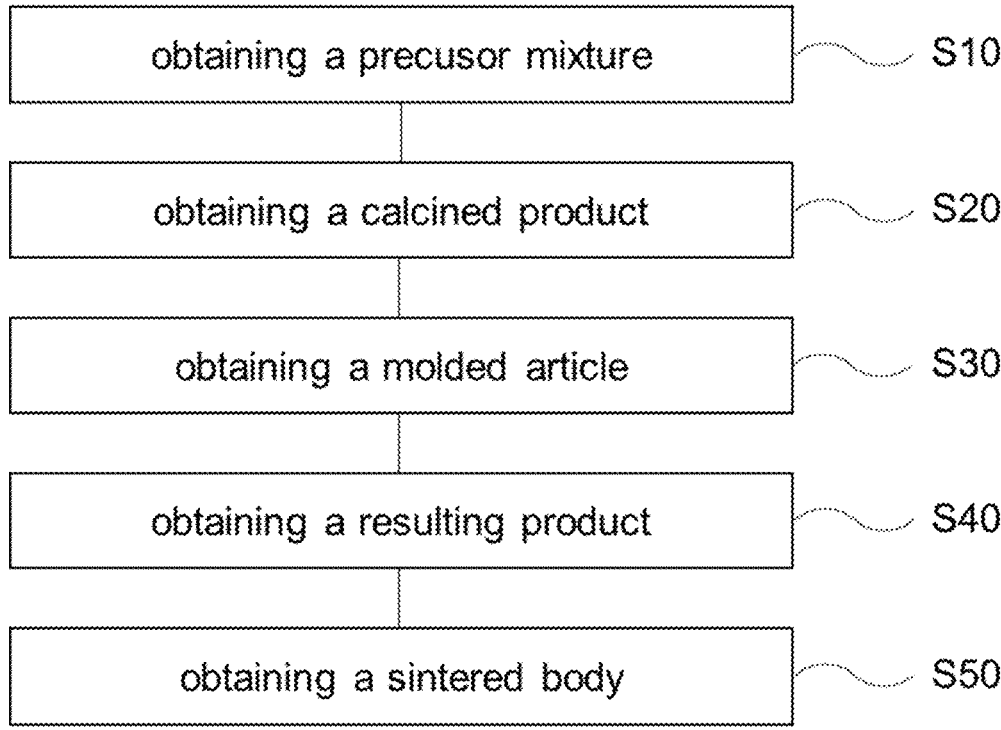
FIG. 1 shows a flowchart of a method for manufacturing an antiferroelectric according to the present disclosure.

The above objects, other objects, features, and advantages of the present disclosure are understood through the following embodiments related to the accompanying drawings. However, the present disclosure is not limited to the embodiments described herein and may be embodied in other forms. Rather, the embodiments introduced herein are provided so that the disclosed content may become thorough and complete, and the spirit of the present disclosure may be sufficiently conveyed to those skilled in the art.

The similar reference numerals are used for similar elements while explaining each drawing. In the accompanying drawings, the dimensions of the structures are illustrated after being enlarged than the actual dimensions for clarity of the present disclosure. Terms such as first, second, etc. may be used to describe various components, but the components should not be limited by the terms. The terms are used only for the purpose of distinguishing one component from another component. For example, a first component may be referred to as a second component, and similarly, the second component may also be referred to as the first component, without departing from the scope of rights of the present disclosure. The singular expression includes the plural expression unless the context clearly dictates otherwise.

In the present specification, terms such as "comprise," "have," etc. are intended to designate that a feature, number, step, operation, component, part, or a combination thereof described in the specification exists, but it should be understood that the terms do not preclude the possibility of the existence or addition of one or more other features, numbers, steps, operations, components, parts, or combinations thereof. Further, when a part of a layer, film, region, plate, etc. is said to be "on" other part, this includes not only the case where it is "directly on" the other part, but also the case where there is another part in the middle therebetween. Conversely, when a part of a layer, film, region, plate, etc. is said to be "under" other part, this includes not only the case where it is "directly under" the other part, but also the case where there is another part in the middle therebetween.

Unless otherwise specified, because all numbers, values, and/or expressions expressing quantities of components, reaction conditions, polymer compositions, and formulations used in the present specification are approximate values reflecting various uncertainties of the measurement that arise in obtaining these values among others in which these numbers are essentially different, they should be understood as being modified by the term "about" in all cases. Further, when a numerical range is disclosed in this description, such a range is continuous, and includes all values from a minimum value of such a range to the maximum value including a maximum value, unless otherwise indicated. Furthermore, when such a range refers to an integer, all integers including from the minimum value to the maximum value including a maximum value are included, unless otherwise indicated.

Method for Manufacturing Antiferroelectric

FIG. 1 is a flowchart showing a method for manufacturing an antiferroelectric according to the present disclosure. Hereinafter, the present disclosure is described in more detail with reference to the accompanying drawings.

Referring to FIG. 1, the method for manufacturing an antiferroelectric according to the present disclosure may include: mixing dielectric precursors to obtain a precursor mixture (S10); calcining the precursor mixture to obtain a calcined product (S20); pressurizing the calcined product to obtain a molded article (S30); adding dysprosium (Dy) to the molded article to obtain a resulting product (S40); and sintering the resulting product to obtain a sintered body/antiferroelectric (S50).

The step S10 is a step of mixing dielectric precursors to obtain a precursor mixture. The dielectric precursors are mixed and synthesized to provide elements capable of constituting the dielectric framework of the present disclosure, and specifically include elements such as lead, zirconium, titanium, lanthanum, tin, and combinations thereof.

The dielectric precursors may include 50% by weight to 60% by weight of lead oxide (PbO), 15% by weight to 30% by weight of zirconium oxide $(ZrO_2)$, 1% by weight to 5% by weight of titanium oxide $(TiO_2)$, 8% by weight to 14% by weight of lanthanum oxide $(La_2O_5)$, and 1% by weight to 16% by weight of tin oxide $(SnO_2)$.

At this time, if the content is out of the above range, it is impossible to obtain an antiferroelectric comprised of lead, zirconium, titanium, lanthanum, and tin at an optimal mole ratio.

The step S20 is a step of calcining the precursor mixture to obtain a calcined product. Specifically, it is a step of obtaining a molded article with the precursor mixture, obtaining a resulting product, and performing heat treatment before proceeding with sintering.

The calcination may be performed at a temperature in a range of 700° C. to 900° C. for 2 hours to 5 hours.

After the calcination, a pulverization process may be added if necessary in order to form a powder of even particles.

The step S30 is a step of pressurizing the calcined product to obtain a molded article. The calcined product may be granulated prior to molding, and may be mixed with a binder and a solvent to be granulated.

The granulated calcined product may be molded into a desired shape, and may be molded by, for example, pressurization.

When the binder and the solvent are used, a binder removal process for removing the binder and the solvent may be further performed, and the binder removal process may be performed through heat treatment of about 500° C. to 700° C., and the binder and the solvent may be removed by the heat treatment.

The step S40 is a step of adding dysprosium (Dy) to the molded article to obtain a resulting product.

Dysprosium (Dy) may be contained in an amount of about 0.1% by weight to 0.4% by weight based on 100% by weight of the antiferroelectric. If the content of dysprosium is out of the above range, there may be a problem in that it has a breakdown voltage (BDV) of about 10 kV/mm or less.

That is, when dysprosium is added to the antiferroelectric as in the present disclosure, it is possible to obtain the effect of having a target breakdown voltage of about 10 kV/mm or more.

The step S50 is a step of sintering the resulting product to obtain a sintered body. Sintering may be performed for the purpose of making the calcined product powder particles constituting the resulting product adhere to each other and harden.

In order to solve this, a sintered agent is added in this step of the present disclosure, and the sintered agent is inputted for the purpose of lowering the sintering temperature, but there is also an effect of increasing the density and shrinkage of the dielectric.

The sintered agent may include 1% by weight to 4% by weight of zinc oxide (ZnO) and 1% by weight to 10% by weight of lead oxide (PbO).

The sintered agent may include 2% by weight to 4% by weight of zinc oxide (ZnO) and 6% by weight to 10% by weight of lead oxide (PbO).

At this time, when the sintered agent includes less than 1% by weight of zinc oxide (ZnO), there may occur a problem that the density is lowered. In addition, when the sintered agent includes more than 10% by weight of lead oxide (PbO), there may occur a problem that both of the density and shrinkage are lowered.

The step of manufacturing the sintered body may be performed at a sintering temperature in a range of 900° C. to 1100° C. for 2 to 5 hours. In the state of the art, the dielectric manufacturing process may be performed at a sintering temperature of 1300° C. or higher, whereas the sintering of the present disclosure may be performed at a relatively low temperature (i.e., lower than 1300° C.).

Antiferroelectric

The antiferroelectric according to the present disclosure may have a $Pb_xLa_{1-x}([Zr_{1-y}Sn_y]_ZTi_{1-Z})$ composition (X, Y, and Z are individually within a range of 0 to 1).

The present disclosure is characterized in that it can be used at high voltage and has a high permittivity by applying an antiferroelectric material whose permittivity increases as it is used at high voltages.

The present disclosure can improve the storage energy density by substituting Sn for Zr in $Pb(La)(Zr, Ti)O_3$ (hereinafter, PLZT) including lead, lanthanum, zirconium, and titanium as an antiferroelectric material.

X may be $0.87 \leq X \leq 0.89$.

Y may be $0.53 \leq Y \leq 0.55$.

Z may be $0.77 \leq Z \leq 0.79$.

The antiferroelectric may have a density in a range of 7.5 $g/cm^3$ to 8.0 $g/cm^3$.

The antiferroelectric may have a permittivity (c) of 1000 or more.

The antiferroelectric may have a breakdown voltage of about 10 kV/mm or more.

Capacitor

The capacitor according to the present disclosure includes an antiferroelectric according to the present disclosure and an electrode provided on the surface of the antiferroelectric. The electrode is characterized by including copper (Cu).

Hereinafter, the present disclosure is described in detail with reference to the following Experimental Examples. However, the technical spirit of the present disclosure is not limited or restricted thereto.

Experimental Example 1: Changes in Permittivity Values and Breakdown Voltage Values According to Addition of Dysprosium (Dy)

First, the permittivity (c) values and the breakdown voltage (BDV) values were measured when the Zr/Sn content, which is the Z value, was 0.76, 0.78, 0.80, 0.82, and 0.84. The results are as shown in FIG. 2.

Figure 2:
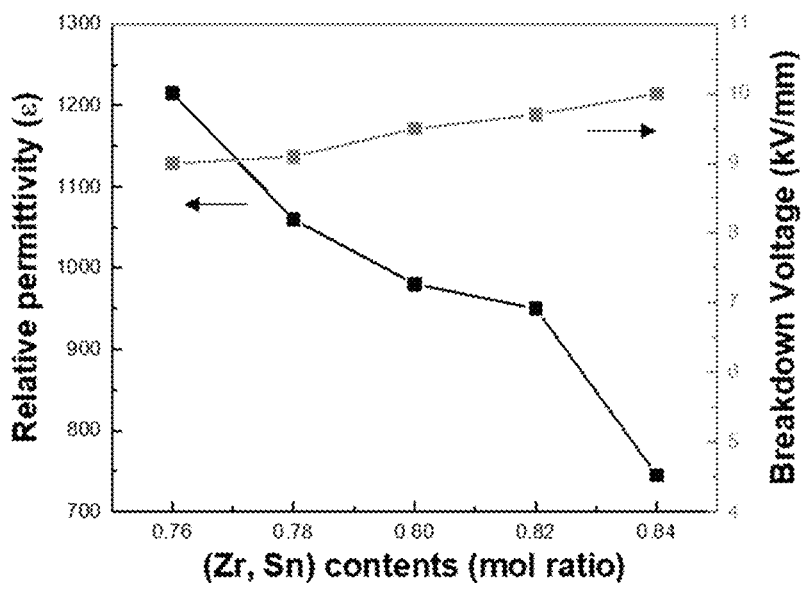
FIG. 2 shows the permittivity values and breakdown voltage values according to the (Zr/Sn) mole ratios (Z values) in a $Pb_{0.88}La_{0.12}([Zr_{0.46}Sn_{0.54}]_ZTi_{1-Z})$ composition.

FIG. 2 is results of measuring permittivity values and breakdown voltage values according to the (Zr/Sn) mole ratios (Z values) in a $Pb_{0.88}La_{0.12}([Zr_{0.46}Sn_{0.54}]_ZTi_{1-Z})$ composition. Referring to FIG. 2, when Z was 0.82, the breakdown voltage value was good, and the permittivity value was not maintained too low.

In order to check whether the addition of dysprosium (Dy) affects the breakdown voltage, an experiment of checking the effect on the composition by adding dysprosium was conducted when Z was 0.82 as described above. The results are as shown in FIGS. 3 and 4.

Figure 3:
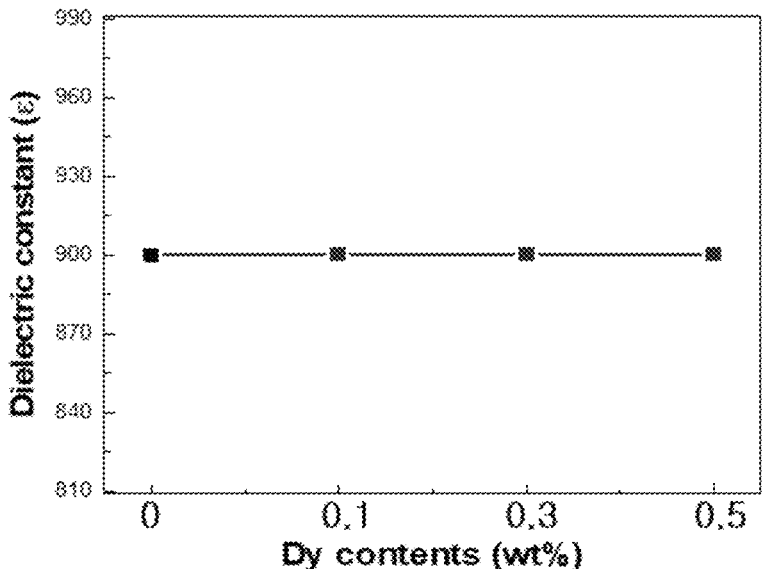
FIG. 3 shows the permittivity values according to the addition of dysprosium in a $Pb_{0.88}La_{0.12}([Zr_{0.46}Sn_{0.54}]_{0.82}Ti_{0.18})$ composition.
Figure 4:
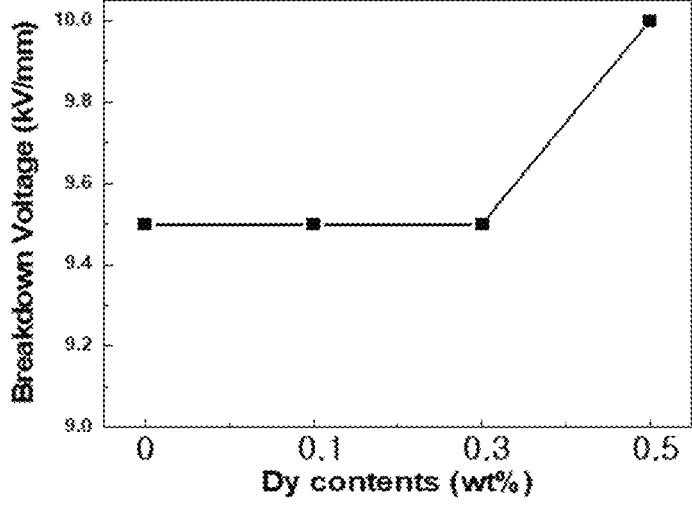
FIG. 4 shows the breakdown voltage values according to the addition of dysprosium in a $Pb_{0.88}La_{0.12}([Zr_{0.46}Sn_{0.54}]_{0.82}Ti_{0.18})$ composition.

FIG. 3 is results of measuring permittivity values according to the addition of dysprosium in a $Pb_{0.88}La_{0.12}$ $([Zr_{0.46}Sn_{0.54}]_{0.82}Ti_{0.18})$ composition. FIG. 4 is results of measuring breakdown voltage values according to the addition of dysprosium in a $Pb_{0.88}La_{0.12}([Zr_{0.46}Sn_{0.54}]_{0.82}Ti_{0.18})$ composition. Referring to FIGS. 3 and 4, it can be confirmed that the addition of dysprosium does not affect the permittivity but affects the breakdown voltage.

Experimental Example 2: Addition of Dysprosium to Antiferroelectrics Having Different Compositions The permittivity values and breakdown voltage values of the antiferroelectrics which had contents of Zr/Sn, which are Z-values, of 0.76, 0.78, 0.80, 0.82, and 0.84, and were manufactured by adding 0.1% by weight of dysprosium (Dy) were measured. The results are as shown in FIG. 5.

Figure 5:
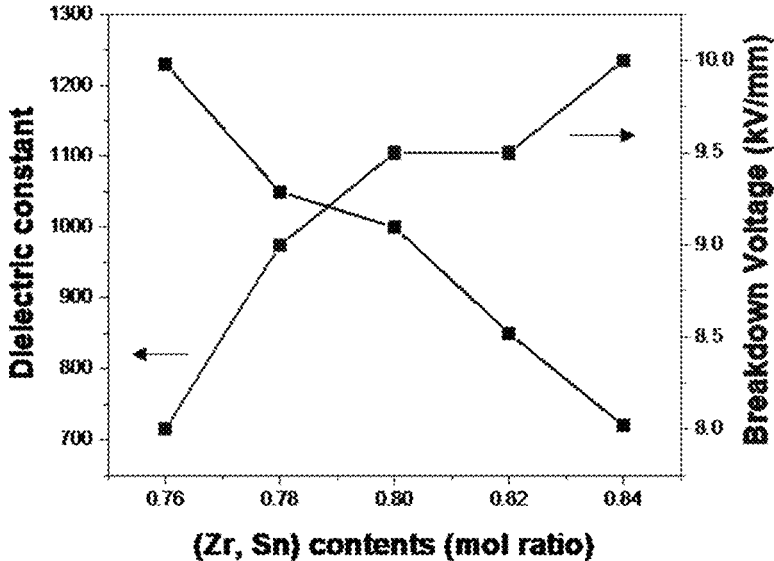
FIG. 5 shows the permittivity values and breakdown voltage values according to the (Zr/Sn) mole ratios (Z values) in a $Pb_{0.88}La_{0.12}([Zr_{0.46}Sn_{0.54}]_ZTi_{1-Z})$ composition.

FIG. 5 is results of measuring permittivity values and breakdown voltage values according to the (Zr/Sn) mole ratios (Z values) in a $Pb_{0.88}La_{0.12}([Zr_{0.46}Sn_{0.54}]_ZTi_{1-Z})$ composition. Referring to FIG. 5, when the Z value is 0.76, it can be confirmed that the permittivity value is 1000 or more, but the breakdown voltage value is too low. In addition, when the Z value is 0.80, it can be confirmed that the breakdown voltage value is high, but the permittivity value is low. When the Z value is 0.78, it can be confirmed that, the permittivity value is 1000 or more and the breakdown voltage value is also higher than that of Z=0.76.

In other words, because it was confirmed through Experimental Example 1 above that the permittivity values were not improved even when dysprosium was added, it can be confirmed that when the Z value is 0.78 is most appropriate.

Experimental Example 3: Density Values, Permittivity Values, and Breakdown Voltage Values According to Dysprosium Contents Density values, permittivity values, and breakdown voltage values of the antiferroelectrics which had a content of Zr/Sn, which is a Z-value, of 0.78, and were each manufactured by adding 0.1% by weight to 0.5% by weight of dysprosium (Dy) were measured. The results are as shown in FIGS. 6 and 7.

Figure 6:
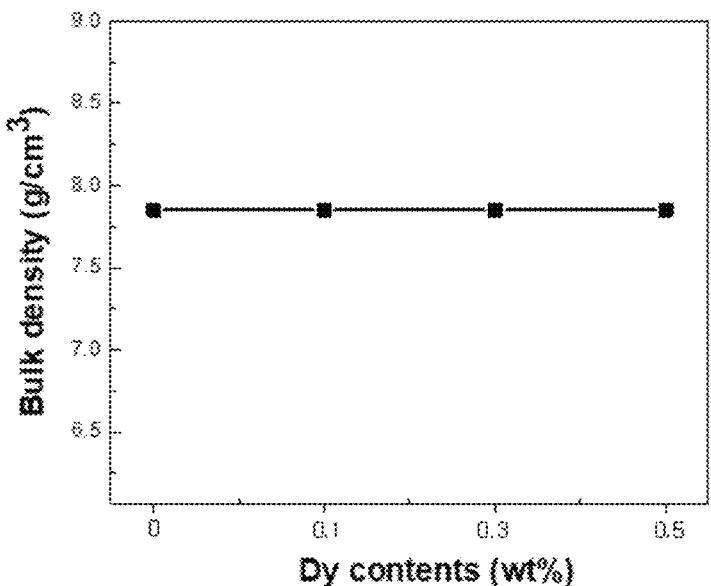
FIG. 6 shows the density values according to the contents of dysprosium (Dy) in a $Pb_{0.88}La_{0.12}([Zr_{0.46}Sn_{0.54}]_{0.78}Ti_{0.22})$ composition.
Figure 7:
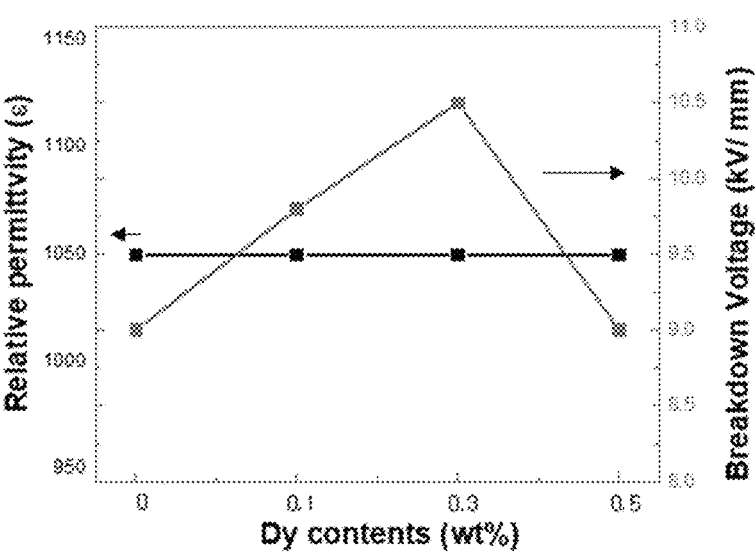
FIG. 7 shows the permittivity values and breakdown voltage values according to the contents of dysprosium (Dy) in a $Pb_{0.88}La_{0.12}([Zr_{0.46}Sn_{0.54}]_{0.78}Ti_{0.22})$ composition.

FIG. 6 is results of measuring density values according to the contents of dysprosium (Dy) in a $Pb_{0.88}La_{0.12}$ $([Zr_{0.46}Sn_{0.54}]_{0.78}Ti_{0.22})$ composition. FIG. 7 is results of measuring permittivity values and breakdown voltage values according to the contents of dysprosium (Dy) in a $Pb_{0.88}La_{0.12}([Zr_{0.46}Sn_{0.54}]_{0.78}Ti_{0.22})$ composition. Referring to FIGS. 6 and 7, it can be confirmed that there is no change in density values even if dysprosium is added, and the antiferroelectric to which 0.3% by weight of dysprosium was added has a permittivity value of 1000 or more and satisfies a breakdown voltage value of 10 kV/mm or more.

Accordingly, the present disclosure may provide an antiferroelectric which has a $Pb_xLa_{1-x}([Zr_{1-y}Sn_y]_ZTi_{1-Z})$ composition and is manufactured through appropriate mixing and dysprosium addition to have high permittivity and breakdown voltage, and a method for manufacturing the same.

Hereinabove, embodiments of the present disclosure have been described, but those of ordinary skill in the art to which the present disclosure pertains will understand that the present disclosure may be implemented in other specific forms without changing the technical spirit or essential features thereof. Therefore, it should be understood that the embodiments described above are illustrative in all respects and not restrictive.

What is claimed is:

1. A method for manufacturing an antiferroelectric, the method comprising:

mixing dielectric precursors to obtain a precursor mixture, wherein the dielectric precursors comprise: 50%-60% by weight of lead oxide (PbO); 15%-30% by weight of zirconium oxide ($ZrO_2$); 1%-5% by weight of titanium oxide ($TiO_2$); 8%-14% by weight of lanthanum oxide ($La_2O_5$) and 1%-16% by weight of tin oxide ($SnO_2$);

calcining the precursor mixture to obtain a calcined product;

pressurizing the calcined product to obtain a molded article;

adding dysprosium (Dy) to the molded article to obtain a resulting product; and sintering the resulting product to obtain the antiferroelectric, wherein the antiferroelectric has a $Pb_xLa_{1-x}([Zr_{1-y}Sn_y]_zTi_{1-z})$ composition, and X, Y, and Z are individually greater than 0 and less than 1.

2. The method of claim 1, wherein the dysprosium (Dy) is contained in an amount of 0.1% by weight to 0.4% by weight based on 100% by weight of the antiferroelectric.

3. The method of claim 1, wherein the sintering comprises adding a sintered agent, and wherein the sintered agent comprises 1%-4% by weight of zinc oxide (ZnO) and 1%-10% by weight of lead oxide (PbO) based on 100% by weight of the antiferroelectric.

4. The method of claim 1, wherein the sintering is conducted at a sintering temperature in a range of 900° C. to 1100° C.

5. The method of claim 1, wherein X is $0.87 \leq X \leq 0.89$.

6. The method of claim 1, wherein Y is $0.53 \leq Y \leq 0.55$.

7. The method of claim 1, wherein Z is $0.77 \leq Z \leq 0.79$.

8. The method of claim 1, wherein the antiferroelectric has a density in a range of 7.5 $g/cm^3$ to 8.0 $g/cm^3$.

9. The method of claim 1, wherein the antiferroelectric has a permittivity ($\varepsilon$) of 1,000 or more.

10. The method of claim 1, wherein the antiferroelectric has a breakdown voltage of 10 kV/mm or more.

* * * * *